Jan. 2 1968  B. J. MIDLOCK  3,362,009
SONIC VEHICLE DETECTOR

Filed May 20, 1966  4 Sheets-Sheet 1

INVENTOR
BERNARD J. MIDLOCK
BY
Edward H. Eames
ATTORNEY

FIG.3

Jan. 2 1968  B. J. MIDLOCK  3,362,009
SONIC VEHICLE DETECTOR
Filed May 20, 1966  4 Sheets-Sheet 3

FIG. 4

INVENTOR
BERNARD J. MIDLOCK
BY
ATTORNEY

FIG.5

# United States Patent Office 3,362,009
Patented Jan. 2, 1968

3,362,009
SONIC VEHICLE DETECTOR
Bernard J. Midlock, Norwalk, Conn., assignor to Laboratory for Electronics, Inc., Waltham, Mass., a corporation of Delaware
Filed May 20, 1966, Ser. No. 551,692
11 Claims. (Cl. 340—1)

This invention relates to sonic detection systems for indicating the presence of an object, such as a motor vehicle, in a defined space or zone.

The invention more particularly relates to vehicle detection apparatus employing a single transmitter-receiver in which sonic waves, of a frequency substantially above normal audio frequencies, are periodically transmitted by a highly directional sonic wave transmitting system for very short intervals of time and, between the transmission intervals, reflected transmitted sonic waves are received, with the reception interval or receiver time predetermined in the cyclic operation of the detector so as to define an area from which reflected transmitted sonic waves may be received and to which the detector device will respond and provide a detection indication.

The sonic detector which is the subject of this invention utilizes a pulse-echo technique which provides transmission of pulses at predetermined intervals with predetermined intervals for reception of reflected signals.

In the field of traffic control it is most desirable to provide a detection device which will detect vehicles within a defined space, such as a traffic lane of a roadway and within a particular limited range, as for example, from as close as about two feet from a transmission point such as a sonic transducer, to as far as about fifteen feet from such transmission point in the case of a substantially vertical transmission beam from an over-the-road position of the sonic transducer, but to as far as about 30 to 35 feet from the transmission point but not farther, in case of an angled or substantially horizontal beam across the traffic path from a side-of-the-road position or "side-fire" position of the sonic transducer, and which will detect all vehicles both moving and standing within the defined zone, over a very wide range of speeds from a dead stop to traveling very fast, at super highway speeds, for example, through the defined zone.

My sonic wave vehicle detector device accurately and dependably senses and provides a detection signal for a motor vehicle in a defined detection zone. The vehicle may be at a dead stop in the detection zone or passing through the detection zone, over a wide range of speed. The size or shape of the vehicle may vary widely from small compact passenger vehicles to large commercial trucks.

Although my sonic vehicle detector as illustrated herein may be slightly modified so as to utilize two transducers or two sonic heads, one transducer or sonic head for transmitting sonic waves and a second transducer or sonic head for receiving sonic waves, I have found that using a common sonic head for transmitting and for receiving has certain advantages over the two sonic head unit in which each sonic head is used separately for transmitting and receiving.

Primarily, the system I have selected is a pulse-echo system which lends itself to using a common transducer or common sonic head for both transmitting and receiving sonic waves since, in the cycle of operation of the detector device, a blanking signal is developed in the receiver circuitry during the period of transmission so that dual use of a single transducer or sonic head is most practical rather than employing separate alternate sonic heads during non-overlapping intervals during the sonic cylce.

I have controlled the cyclic rate of my sonic vehicle detector by a repetition rate multi-vibrator, which is used to initiate each cycle of pulse-echo operation. This time cycle of the repetition rate or the time spacing between one transmission pulse and the next transmission pulse should be at least long enough to permit the first transmitted pulse to complete an excursion to the farthest extreme of the detection zone and return to the receiver, while such time cycle should be sufficiently short so as to complete at least one such pulse-echo cycle during the time it takes a small vehicle, traveling at a high rate of speed, to pass through the detection zone. The time such vehicle spends in the detection zone depends upon the length of the zone in the traveled direction, the speed of the vehicle through the detection zone and the length of the vehicle, or of the part of the vehicle reflecting ultrasonic waves.

In the preferred embodiment of the invention described below, an example is given of a preferred repetition period or pulse-echo cycle and parts thereof suitable for a desired detection zone or range thereof and a wide range of speeds of different vehicles under normal traffic conditions.

In my preferred circuit arrangement I employ a single electro-acoustical transducer which may transmit and receive ultrasonic sound waves of frequencies approximating 19,000 cycles per second (19 kc.).

It will be appreciated that for timing functions in the circuitry of my sonic vehicle detector, time may be considered as having an equivalent distance based on the normal speed of sound through air (approximately 1090 feet per second); however, one must consider an excursion of a transmitted sound wave, emanating from the transmitting unit and traveling toward a detection zone or target area with the reflection of such sound wave and its direct return to the receiving unit. Thus, a distance of, for example, four feet from the transmitter/receiver unit or sonic head, will be considered and timed as eight feet of distance, because of the round trip excursion of a sound wave, and the time may be calculated as the time of travel of the sound wave pulse over the distance of eight feet at the normal speed of sound through air, and for purposes of timing may be timed from initiation of the transmitted ultrasonic pulse.

Taking advantage of the time delay between termination of the transmitted pulse and the beginning of the receiving interval, my preferred circuit arrangement uses one transducer which is alternately employed as a transmitting electrical acoustical transducer and as a receiving acoustical electrical transducer. Further, I have taken advantage of certain vibration characteristics in the transducer in which damped, briefly continued oscillation of the transducer, at the transmitted frequency, is provided after the electrical energy driving the transducer has been turned "off."

Because of the characteristic of providing a defined detection zone with sharply defined extremes, my vehicle detector may be employed in an off-the-surface side-fire position, in lieu of locating the sonic head in an over-the-road position. When operating in a side-fire position, the sonic head may be located at the side of a roadway, some distance above the surface of the roadway, with the directional acoustical horn positioned so as to direct the sonic waves substantially horizontally, across the path of travel of vehicles with the detection zone adjusted so as to intercept with the pathway of a vehicle traveling along such pathway. Because of the sharply defined extremes of the detection zone my detector, when operating in a side-fire position, may detect vehicles traveling along one lane and may ignore vehicles traveling in adjacent lanes according to the position of the detection zone.

It is, therefore, an object of this invention to provide an improved vehicle detector employing transmission and reception of ultrasonic waves through air to detect and indicate the presence of vehicles moving through or standing in a defined detection zone.

Another object is to provide an improved ultrasonic detector device employing the pulse-echo effect for detecting the presence of standing and/or moving vehicles in a defined detection zone.

A further object is to provide an improved vehicle detector device employing the pulse-echo effect of ultrasonic waves in air in which a common acoustical transducer is used both for transmission and reception of ultrasonic waves.

A still further object is to provide an improved ultrasonic vehicle detector device employing the pulse-echo effect which may be operated with the transmitter/receiver in an over-the-road position, projecting transmitted pulses substantially vertically downward, or may be operated with the transmitter/receiver alongside a traffic lane in a side-fire position in which the transmitted pulses are projected substantially horizontally across the path of vehicles traveling along a roadway and may distinguish between vehicles in near and far lanes or on the near and far sides of the roadway, if desired.

Another object of this invention is to provide a continuously running oscillator, the output of which is normally clamped but is periodically unclamped or leased during a brief transmitting period as determined by a repetition rate multi-vibrator, and in which the multi-vibrator initiates, upon initiation of the transmitting period, a blanking period to prevent recepton of the transmitted waves by a receiver portion of the system.

It is a further object of this invention to provide a switching signal for a transducer which will not result in an audible "key click."

It is a further object of this invention to provide a period during which the receiver in a vehicle detector system is operative during a clearly defined period, which period is variable.

Other objects will become apparent from a reading of the description and claims with reference to the accompanying drawings, in which:

Figure 1:
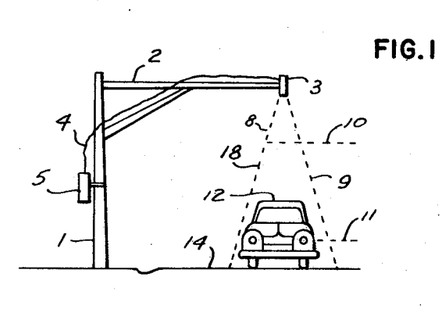
FIG. 1 is a front view of a portion of a roadway over which the transmitter-receiver vehicle detector of the present device is located.

Referring to FIG. 1, a front view of part of a roadway and the adjacent curb and roadside are illustrated with a vehicle on the roadway and my vehicle detector mounted with the transmitter/receiver unit or sonic head in an over-the-road position, directing an ultrasonic beam vertically downward toward the roadway. A pole 1 including a suspension arm 2 is shown as one method of mounting the transmitter/receiver unit or sonic head 3 and the remainder of the circuitry 5, which units are electrically connected by lead 4.

A divergent beam of ultrasonic waves, represented by broken lines 8 and 9 is directed vertically downward from the unit 3 and forms a cone in which the detection zone is defined.

The detection zone is formed substantially within the length of the divergent beam with the closest extreme of the detection zone, relative to the transmitter/receiver unit or sonic head, represented by broken line 10. The position of the closest extreme of the vertical detection zone is determined by the speed of sound through air and the time of delay between initiation of the transmitted pulse and the beginning of the receiving interval. This is adjustable so that the position of line 10 is merely representative of the closest extreme of detection zone.

One example of a suitable transducer and wave directive assembly for use with this system, without limitation thereto, may be found in co-pending application Ser. No. 456,630, filed May 18, 1965, entitled, Ultra Sonic Wave Directive Assembly, in which I am a co-inventor.

The most distant extreme of the vertical detection zone, relative to the sonic head, is represented by the broken horizontal line 11. The distance of this most distant extreme from the sonic head is determined by the speed of sound through air and the time period between the start of the cycle and termination of the receiving interval. In the preferred form the most distant extreme of the detection zone is somewhat above the surface of the ground so reflections of the directed sonic waves from the ground may be effectively blocked out. The vehicle 12, although illustrated as a passenger automobile, represents any type of motor vehicle.

Figure 2:
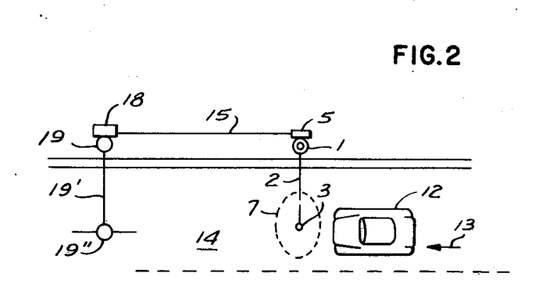
FIG. 2 is a plan view of a roadway over which a transmitter-receiver vehicle detector constructed in accordance with the teachings of this invention is located.

Referring now to FIG. 2, the plan or overhead view of the roadway shown in FIG. 1 is represented with the vehicle 12 proceeding in the direction of arrow 13 on part of the roadway 14.

The broken line elliptical pattern 7 in FIG. 2 illustrates in a general way the preferred beam pattern on the roadway formed by the divergent beam illustrated by the broken lines 8 and 9 in FIG. 1.

FIG. 2 also includes the pole 1 and suspension arm 2 which supports the sonic head 3. It should be understood that the complete sonic vehicle detector is represented in two separate parts; namely, the transmitter/receiver unit or sonic head 3, and the remainder of the circuitry represented as block 5 in FIGS. 1 and 2 with a lead 4 connecting the two separate units. FIG. 2 also shows lead 15 which connects the separated circuitry of the sonic vehicle detector to a block 18 which may represent a traffic signal controller. Such a signal controller 18 may be mounted on a pole 19 which may be similar to pole 1 with a suspension arm 19' which may be similar to suspension arm 2. The arm 19' may suspend a traffic signal light 19'' or other device used for communicating traffic control information to drivers of vehicles proceeding along the roadway, such as vehicle 12.

The block 18 may also represent a vehicle counter which may count and/or record the number of vehicles passing under the transmitter/receiver unit in total and/or over a time period. If the block 18 were a vehicle counter then the signal 19'' would not ordinarily be controlled by such vehicle counter. However, the block 18 could represent a box or cabinet which may serve to store control devices and may include a traffic signal controller controlling the signal 19'' and a vehicle counter counting the number of vehicles in the traffic flow.

Figure 3:
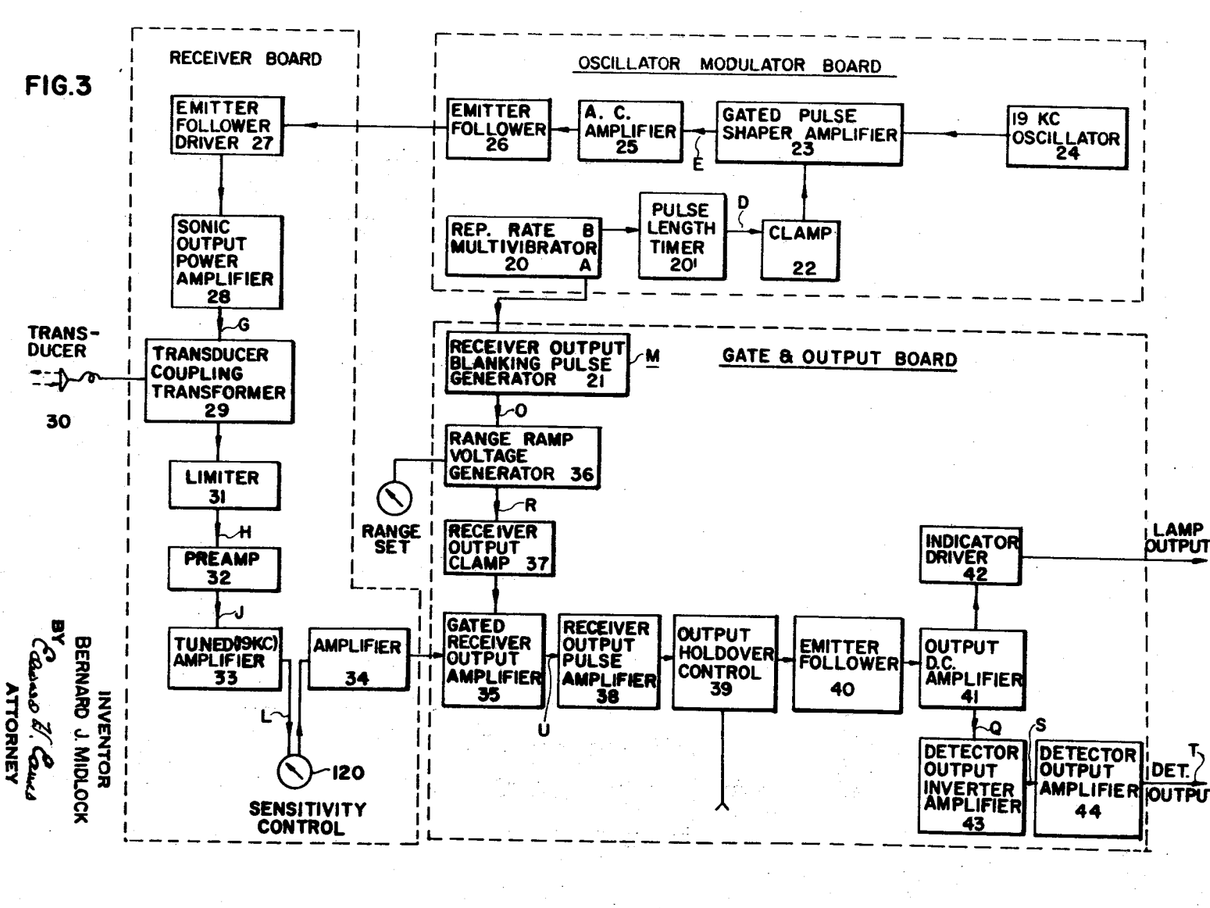
FIG. 3 is a block diagram of the preferred form of vehicle detector constructed in accordance with the teachings of this invention with the blocks functionally labeled.
Figure 5:
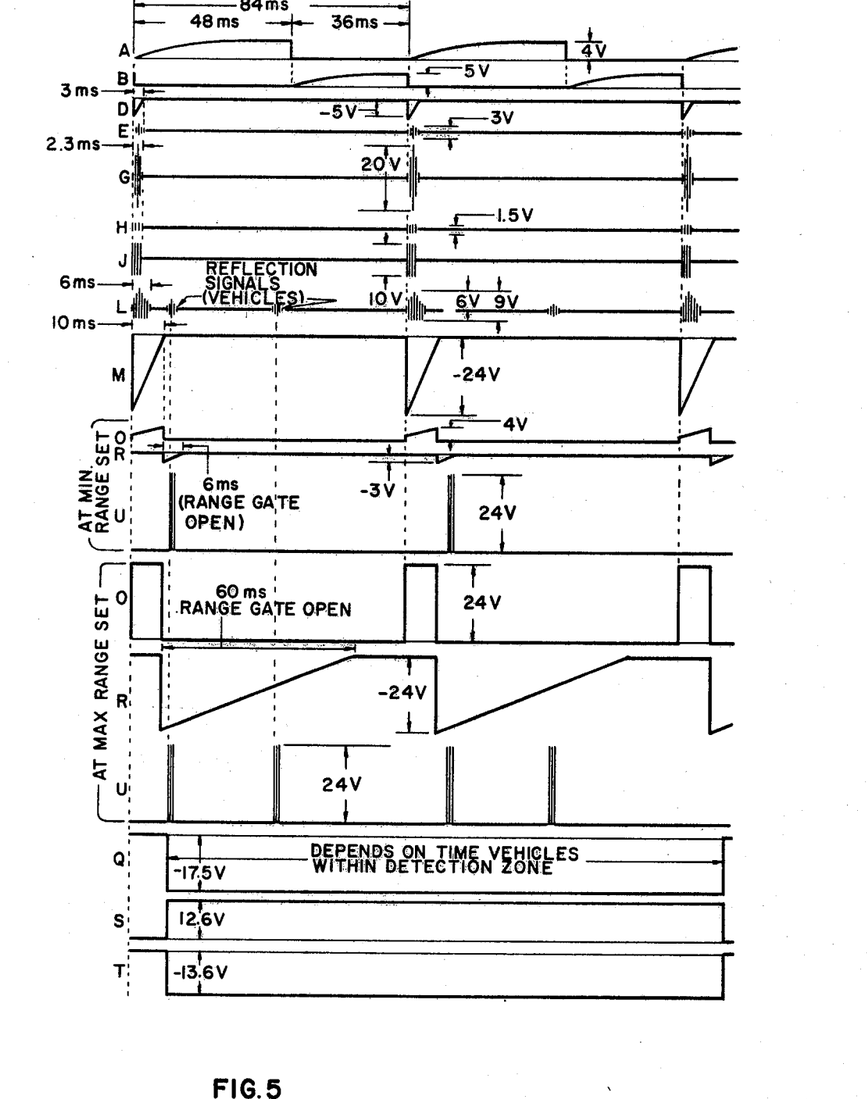
FIG. 5 is a chart showing various wave forms within the system shown in FIGS. 3 and 4.
Figure 6:
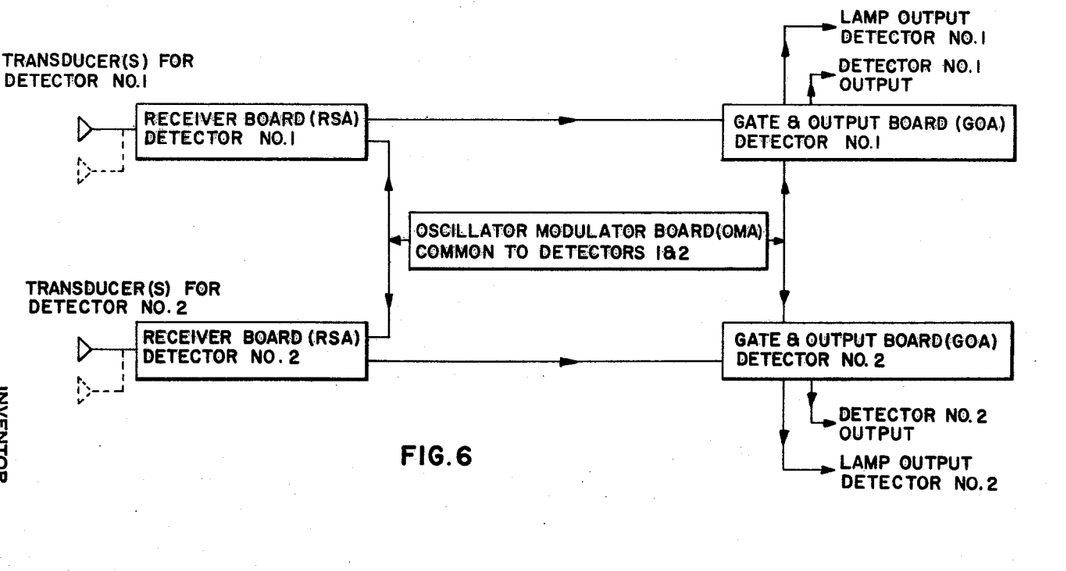
FIG. 6 is a block diagram of a form of the invention in which multiple sonic detectors for the same street or the same phase of a traffic actuated controller may have some common elements shared by the detectors. Thus, as shown in FIG. 6, the oscillator-modulator circuit board may be common to different receiver circuit boards and to different gate and output circuit boards for detector No. 1 and detector No. 2 for the same traffic phase for example.

In the block diagram of the preferred form of the system in FIG. 3, repetition rate multi-vibrator 20 provides alternating A and B outputs which are applied to receiver output blanking pulse generator 21 and to pulse length timer 20', respectively, the latter controlling clamping circuit 22. Both wave forms A and B are shown in FIG. 5.

The negative going trailing edge of the 36 millisecond wave provided at the B side of multi-vibrator 20 in each cycle serves to initiate suitable time constant producing circuitry in the pulse length timer 20', to release clamping circuit 22 to unclamp gated pulse shaper amplifier 23, to allow the passage of the 19 kc. alternating wave produced in oscillator 24 for a period of 3 milliseconds, for example, commencing with the termination of the positive part of the B signal in multi-vibrator 20. The output D of pulse timer 20' is illustrated as wave form D in FIG. 5. The 19 kc. wave burst E is applied to amplifier 25, emitter follower 26, emitter follower driver 27, sonic output power amplifier 28, and to the transducer coupling transformer 29 which couples this output signal to transducer 30. The output G of amplifier 28, which is coupled to transformer 29, is also provided via the transformer at the input of limiter 31 whose output H is passed through preamplifier 32, tuned amplifier 33, and amplifier 34 to the gated receiver output amplifier 35. The outputs G and H above and the output J of amplifier 32 from the 19 kc. burst E, are illustrated at the beginning of the timing cycle in FIG. 5.

At the instant the B output signal of multi-vibrator 20 goes negative (i.e., to zero) the A signal, which is applied to blanking pulse generator 21, begins to slowly rise, providing a signal to output amplifier 35 through range ramp voltage generator 36 and receiver output clamp 37. See pulses M, O and R in FIG. 5. The output U of amplifier 35 is applied to amplifier 38, and thence through control 39, emitter follower 40 and DC output amplifier 41, which provides the driving signal for indicator driver 42, if it is used, or alternatively, it provides the input to detector output inverter amplifier 43 which feeds a detector output through detector output amplifier 44. The circuitry consisting of the inverter amplifier 43 and amplifier 44 can be used or either of these forms of output circuitry can be utilized.

The multi-vibrator 20, therefore, provides the timing for the system with the A signal having a 48 millisecond duration and the B signal having a 36 millisecond duration for example. Since it is the rise of the A signal and the trailing edge of the B signal which are significant in the operation of the circuitry, the beginning of any cycle is considered to be at that point which is the initiation or rise of the A signal of the multi-vibrator 20 which is the instant that the B signal terminates.

The trailing edge of the B signal provides, through the gated pulse shaper amplifier 23, a 3-millisecond transmission period during which the 19 kilocycle wave provided by oscillator 24 is transmitted. The rising A wave initiates in the receiver output blanking pulse generator, a 10 millisecond blanking period, illustrated at M in FIG. 5. The first 3 milliseconds of transmission period are the first 3 milliseconds of the 10 millisecond blanking period. The blanking period is necessary in view of the application of the output signal to limiter 31 by means of coupling transformer 29. In the absence of a blanking period the transmitted wave would be received as a false indication that a target was present.

The range ramp voltage generator, as will be seen below, provides the range period which begins at the termination of the blanking period and can extend for 6 milliseconds from 10 ms. to 16 ms. for minimum range, or to 60 milliseconds from 10 ms. to 70 ms. for maximum range. It is during the range period that the gated receiver output amplifier 35 is conditioned to receive signals from amplifier 34 and pass them to amplifier 38. It is understood, therefore, that the apeparance of an input signal at amplifier 38 occurs only during a range period and at which time a signal is being received indicating a target via limiter 31, amplifiers 32, 33, 34 and gate 35.

Figure 4:
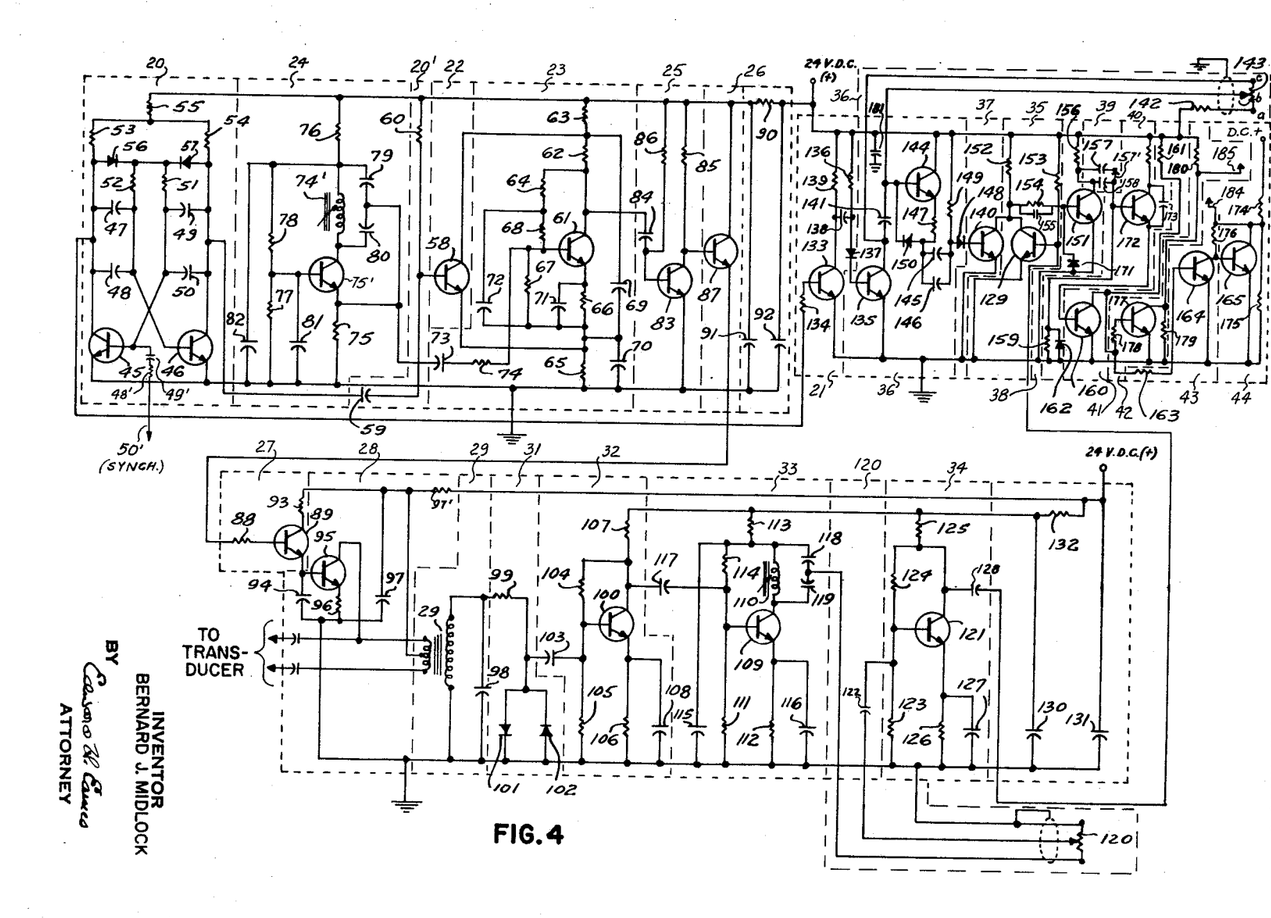
FIG. 4 is a circuit diagram of the preferred form of vehicle detector shown in the blocks of FIG. 3.

Referring to FIG. 4, multi-vibrator 20 is comprised of transistors 45 and 46, capacitors 47, 48, 49 and 50, resistors 51, 52, 53, 54 and 55, and diodes 56 and 57. This circuit is standard and the collector of transistor 46 provides the B output and is coupled to the base of transistor 58 by capacitor 59. Capacitor 59 and resistor 60, together with transistor 58 provide the clamping circuit indicated by the numeral 22 in FIG. 3. Transistor 58 is forward biased so that it is normally providing a short circuit or by-pass of transistor 61 in amplifier 23. This amplifier comprises resistors 62, 63, 64, 65, 66, 67, 68 and capacitors 69, 70, 71, 72 in addition to transistor 61.

The output of oscillator 24 is applied to the base of transistor 61 via capacitor 73 and resistor 74, but cannot provide an output signal at the collector of transistor 61 in response to this input while transistor 58 is conducting.

The oscillator 24 is a standard oscillator comprised of tuning inductor 74', transistor 75', resistors 75, 76, 77, 78 and capacitors 79, 80, 81, 82.

When the collector of transistor 46 goes negative at the termination of the B wave as transistor 46 becomes conducting in multi-vibrator 20, it provides a negative going pulse at the base of transistor 58 which makes transistor 58 momentarily non-conducting and unclamps the amplifier 23 by removing the short circuit from transistor 61. This unclamped condition remains for approximately 3 milliseconds, which is the interval it takes capacitor 59 to recover through resistor 60. The period of 3 milliseconds provided by the time constant provided by resistor 60 and capacitor 59 determines the transmission period or the portion of each cycle during which the 19 kilocycle signal developed in oscillator 24 is transmitted. The output of transistor 61 is the signal which appears at its collector during this 3 millisecond period and which is applied to the base of transistor 83 via coupling capacitor 84.

Transistor 83 together with resistors 85 and 86 provide amplifier 25, the collector of which is tied to the base of transistor 87 of emitter follower 26.

Transistor 83 is completely forward biased by resistor 86 so that the negative half of the 3 millisecond burst of 19 kilocycle waves is the effective part of the signal and the positive half of the waves is grounded. In other words, every positive portion of the signal appearing on the base of transistor 83 is grounded through the emitter circuit but every negative going portion of the signal at the base of transistor 83 appears as a rise in collector voltage which is also applied to the base of transistor 87. A corresponding rise appears in emitter voltage of transistor 87 of emitter follower 26 and thence is applied through resistor 88 to the base of transistor 89 of driver 27.

Resistor 90 and capacitors 91 and 92 provide filtering of the positive voltage supply for the circuitry of this oscillator-modulator board within the outer broken line. This voltage supply is 24 volts DC for example.

Resistor 93 is a low resistance for current limiting in the collector circuit of transistor 89 in driver 27, which serves as an emitter follower providing a signal at its emitter which is applied to the base of transistor 95. Transistor 95, with its associated circuitry, the upper part of primary of transformer 29, the resistor 96 and capacitor 94, provides the final stage 28 of amplification of the 19 kc. signal which is applied to transducer coupling transformer 29.

Capacitor 94 provides a by-pass around the base-emitter circuit of transistor 95 for any very low amplitude residual or leakage signal of 19 kc., if present, when the full 19 kc. signal is cut off from driver 27 by the clamping of the amplifier 23, the 19 kc. oscillator continuing free running in this condition. Capacitor 94 has little effect on the normal strong positive excursions of the 19 kc. signal when applied to transistor 95 from driver 27 when amplifier 23 is unclamped, the base-emitter circuit of transistor 95 then providing a relatively low impedance path around capacitor 94; but for low amplitude positive excursions and on all negative-going excursions, this base-emitter circuit remains at relatively high impedance or substantially non-conducting.

Transistor 95 of amplifier 28 is normally biased to cut off until the unclamped 19 kc. signal appears at the base of transistor 89, and then the positive excursions of the 19 kc. signal at this base also appear at the base of transistor 95 and as amplified collector current of transistor 95.

The circuitry preceding the power amplifier 28 essentially provides a switching action to turn amplifier 28 on or off in response to the presence or obsence respectively of the unclamped 19 kc. signal. When the amplifier is on, for the approximate 3 millisecond unclamped period, it delivers a 19 kc. signal to coupling transformer 29 and thence to transducer 30 for conversion to and transmission as a 3 ms. burst or pulse providing a brief train of 19 kc. sonic waves in air.

If amplifier 28 was to be turned on and off in a true switching action—as by a square wave—there would be alternating levels of a DC component representing the time on and the time off of the signal which would be equivalent to a low frequency alternating current signal which would be audible. This is referred to as a "key click" in the art and high pass band filters are normally necessary to eliminate the undesirable audible "key click" in the transducer.

In order to avoid the "key click" and at the same time to avoid the necessity of providing filter circuits to eliminate "key click" the subject invention attacks the problem at its source and does not provide a square wave input to transistor 95. Instead, a gradually increasing and then gradually decreasing amplitude signal burst is provided at the collector of transistor 61 which is the output of amplifier 23.

In order to understand how the gradual rise and fall of the switching signal is accomplished it must be appreciated that the output of gate amplifier 23 is capacitor coupled by capacitor 84 to amplifier 25. Capacitor 84 will charge on the positive part of the signal being applied from the collector of transistor 61 to the base of transistor 83. The capacitor 84 will charge positive on the side of the collector of transistor 61 and negative on the side of the base of transistor 83. The average charge in capacitor 84, therefore, will tend to reduce so that it will tend to forward bias transistor 87 which, in turn, tends to forward bias successively transistors 89 and 95. It is necessary therefore in this circuitry which switches transistor 95 without a mechanical switch and without filter circuits, to keep this DC charge on capacitor 84 as small as possible.

In order to accomplish this, resistors 63 and 65 in the circuit of transistors 61 are made of equal ohmic value so that when transistor 58 is in the clamping condition the resistors 63 and 65 will act as a voltage divider so that the voltage between the two resistors will be zero and there will be a 12 volt drop across each resistor. The collector of transistor 58 therefore will be sitting at 12 volts DC when the supply voltage is 24 volts DC. At this instant the DC voltage applied to the capacitor 84 via the collector circuit of transistor 61 is 12 volts DC.

When transistor 58 is cut off, however, it unclamps the voltage, and the collector of transistor 58 will rise and the voltage at resistance 65 in the emitter circuit will reduce and the time that this effect will progress will be controlled by capacitor 69 which tends to hold back the effect of a sudden increase in the applied voltage to the amplifier through resistor 62, resistor 64, resistor 68 to ground through resistor 67 and through the emitter and resistance 66. The effect of capacitance 69, therefore, is to provide a tapering effect or resistance to change in the DC charge across capacitor 84 thereby producing a tapered leading and trailing edge or envelope of the transmitted signal burst applied to transistor 95, since the DC voltage measured at the collector of transistor 61 remains essentially the same and does not change with the application of the clamping and unclamping at transistor 58. This avoids the "key clicking" effect for if the amplifier 23 was a normally zero biased amplifier the collector voltage would tend to go plus or minus depending upon the circuitry and the transfer of DC voltage to the output stage would provide "key clicking."

It is noted, as indicated in FIG. 3, that the circuitry of this invention is provided in three units; one of these is referred to as an oscillator-modulator board; the second is a gate and output board; and the third is a receiver board. Transistor 87 is provided for the sole purpose of allowing a single oscillator-modulator board to be used with a plurality of receiver boards and gate and output boards. If it were desired to use only a single receiver board and a single gate and output board in a system, the emitter follower 26 could be omitted and the output of amplifier 25 would be fed directly to the input of emitter follower driver 27.

The voltage which is applied to the transducer 30 by coupling transformer 29 is also made available to limiter 31. The transmitted signal is available to limiter 31 at all times that it being transmitted.

The primary of coupling transformer 29 is operated essentially as an auto transformer when the collector of transistor 95 is considered to be driving one-half of the transformer, center tapped, with DC voltage applied to the center tap for the collector of transistor 95. The match of the output circuitry of transistor 95 to the transformer is not essential and the only requisite is that the transistor 95 can amplify the transmitted signal and at the same time provide sufficient current to drive the low impedance transducer circuit which includes the impedance of the full primary of the transformer 29. Capacitor 98 is provided across the secondary of transformer 29 for tuning to the received wave of 19 kilocycles. Resistor 99 connects the input to limiter 31. Transformer 29 is a step-up transformer and since the voltage applied to the transducer also is applied through transformer 29 to the amplifiers 32, 33 and 34, in order to prevent the voltage from appearing on the base of transistor 100 of preamplifier 32 at a high and damaging level, diodes 101 and 102 are provided in parallel with one another and in series with resistance 99 to ground. Placing diodes 101 and 102 back-to-back serves to reduce the voltage level applied to the base of transistor 100. Resistance 99 is a swamping resistor to prevent the secondary of transformer 29 from being shorted by the diodes 101 and 102.

Capacitor 97 is about 1500 microfarads and since the output of the transistor 95 is only a pulse of very short duration, capacitor 97 acts as a storage reservoir for this power and charges up via resistance 97' to a given level, which in the particular application disclosed herein is 15 volts for the particular repetition rate.

The signal is passed from the limiter 31 through capacitance 103, and by means of a voltage divider composed of resistances 104 and 105, a portion of the signal is applied to the base of transistor 100 which is a pre-amplifier stage for tuned amplifier 33. Transistor 100 in pre-amplifier 32 is an ordinary amplifier which is RC coupled by means of capacitance 103 to the output of the limiter 31 and resistances 106 and 107 together with capacitance 108 complete the circuitry of pre-amplifier 32.

Amplifier 33 is a tuned amplifier composed of transistor 109, inductance 110, which is utilized to tune the circuit to 19 kc., resistors 111, 112, 113, 114, capacitances 115 and 116. Capacitance 117 provides the coupling between the collector of transistor 100 and the input at the base of transistor 109. Capacitances 118 and 119 provide a capacitor voltage divider circuit as an output connection which also serves as an output DC isolation circuit for the connection to the potentiometer 120 which serves as the gain control, or sensitivity control, and the arm of the sensitivity control is coupled to the base of transistor 121 in amplifier 34 by capacitance 122.

Amplifier 34 is a standard amplifier operating class A and it is composed of the input coupling capacitance 122, transistor 121, resistances 123, 124, 125 and 126 and by-pass capacitance 127. The output of transistor 121 appearing at its collector is coupled through capacitance 128 to the base of transistor 129 in gated receiver output amplifier 35. Capacitors 130 and 131 together with resistance 132 provide a filter.

It is noted upon reference to FIG. 3 that the gated receiver output amplifier 35, in addition to receiving an input from amplifier 34, receives a second input from receiver output clamp 37. In order to facilitate an explanation of the circuitry, reference will not be made to the A side of multivibrator 20, which is the side of the multivibrator at which the signal output of the collector of transistor 45 appears.

In order to understand the effect of a signal from amplifier 34 as it is applied to the base of transistor 129, the action at transistor 133, which is resistor coupled through resistor 134 to the collector of transistor 45 in multi-vibrator 20 must be considered. Now when the collector of transistor 46 goes negative to unclamp amplifier 23 and release the transmitted pulse, the collector of transistor 45 starts to go positive in a gradually rising wave form. This positive going pulse is applied to the base of transistor 133 through resistor 134, and transistor 133 which is the active element in pulse generator 21 becomes highly conducting and is held there and its collector moves sharply down to approximately ground level from its previous 24 volt supply level. Prior to zero time and immediately before the positive pulse was applied to the base of transistor 133, transistor 135 was in the conducting state due to forward biasing from the DC supply through resistor 136 and diode 137, and during this period capacitor 138 is charging through resistor 139, diode 137 and the base emitter circuit of transistor 135. When the collector of transistor 133 goes negative, i.e., to ground, however, a negative pulse is applied at the junction of resistor 136 and diode 137, removing the forward biasing voltage from the base of transistor 135, cutting it off sharply. The transistor 135 cannot become conducting again until the forward biasing voltage is restored and this cannot occur until capacitor 138 leaks its negative charge or restores itself through resistance 136 and conducting transistor 133. By setting the RC time constant of resistor 136 and capacitor 138, the time required for the base of transistor 135 to move sufficiently positive to allow transistor 135 to become conducting can be predetermined. In this embodiment this RC time constant is selected to be 10 milliseconds. In other words, due to this action, transistor 135 is cut off during the 10 millisecond period following zero time. This is the blanking period—the first 3 milliseconds of which is the transmission period with the last 7 milliseconds allowing sufficient time for transmission to cease and the transducer to restore to a quiescent or normal state.

The range period follows the blanking period. As heretofore pointed out, no signal can pass to amplifier 38 unless transistor 129 has a signal applied to its base and clamp 37 is not clamping transistor 129. Transistor 140 is the active element in clamp 37 and it is normally conducting since it is forward biased and shorting the collector of transistor 129 to ground. During the blanking period and after the end of the range period which follows, transistor 140 is conducting due to the forward bias provided by resistor 149 and diode 148. Diode 148 is also a protective diode.

During the period prior to zero time when transistor 135 was forward biased and conducting, the lower end of capacitor 141 is grounded through the transistor 135 and this capacitor is being charged from the positive DC supply through resistor 142 and the resistance between points $a$ and $b$ of range set potentiometer 143 (the arm of which is at point $b$). The amount of charge available to capacitor 141 at this time is determined by the position of the point $b$ which can be varied with respect to the point $c$ at the upper end of potentiometer 143, since the $b$–$c$ part of the potentiometer is in parallel with capacitor 141, and the potentiometer 143, in series with minimum range resistor 142, provides a voltage divider when transistor 135 is conducting, connecting point $c$ to ground. Therefore, capacitor 141 has been charged to an adjustable voltage level at the instant zero time is reached and transistor 135 is cut off.

Also during the time preceding zero time, the base of transistor 144 is at the voltage of the arm $b$ of the potentiometer 143 and transistor 144 is therefore forward biased and conducting, providing a low resistance charging path for capacitors 145 and 146, via resistor 147, diode 148 and the base-emitter junction of transistor 140. The capacitors 145 and 146 are thus maintained charged to the voltage level determined by the setting of the arm of potentiometer 143 during the period immediately prior to zero time, which level is substantially the level of charge to which capacitors 145, 146 returned in timing the immediately preceding range gate open period as explained more fully below.

At zero time, transistor 135 is cut off as explained previously and this transistor remains cut off for the 10 millisecond blanking period. At the instant transistor 135 is cut off, the collector of transistor 135 immediately rises to the 24 volt DC level less the voltage across capacitor 141 (and part $b$, $c$ of potentiometer 143), and the base of transistor 144 is raised to the 24 volt DC level, so that a charging circuit is provided through the collector-emitter circuit of transistor 144, resistance 147, capacitors 145, 146, diode 148 and the base-emitter circuit of transistor 140 to charge the capacitors 145, 146 to substantially the full voltage of 24 volts. For the time that transistor 135 remains cut off, transistor 140 is still forward biased through resistor 149, diode 148 and its base-emitter circuit, continuing to clamp transistor 129. However, when transistor 135 becomes conducting at the end of the blanking period its collector goes to ground, grounding the side of potentiometer 143 indicated by $c$. At this instant transistor 140 is no longer forward biased, transistor 129 is unclamped at its collector, and the capacitance 145, 146 combination begins to discharge through resistance 149 and diode 150, potentiometer 143 to ground. The transistor 140 cannot be forward biased again until the capacitance 145, 146 combination is returned substantially to the voltage level determined by the position of the arm of potentiometer 143. When the level of voltage charge of the capacitances 145 and 146 returns to the level of the range setting as determined by the position of the center tap of potentiometer 143, the diode 148 becomes conducting and the transistor 140 becomes forward biased again and conducts, clamping the output of transistor 129. The capacitors 145, 146 remain approximately at this charge level corresponding substantially to the $b$ to $c$ voltage setting of potentiometer 143 for the brief time remaining before the next blanking period at the beginning of the next pulse repetition cycle.

It is seen, therefore, that the length of time that transistor 140 is cut off and transistor 129 is unclamped is dependent upon the position of the center tap of potentiometer 143. The position of this center tap determines the level to which the capacitors 145 and 146 must return after the termination of the blanking period and during the period when transistor 135 is conducting. The capacitors 145 and 146 during this period seek the voltage level determined by the position of the center tap $b$ of potentiometer 143 with reference to point $c$ or ground.

The period during which transistor 140 is not conducting follows the 10 millisecond blanking period and can be determined by the difference between the fully charged level of capacitors 145, 146 in the blanking period and the final charge on capacitors 145 and 146 which is determined by the potentiometer arm. Movement of the potentiometer arm in the direction of the letter $a$ in the drawing moves the arm closer to the 24 volt DC supply so that the final voltage level of the capacitors 145, 146 at completion of their timing discharge from substantially the 24 volt supply level to this final level is nearer to the 24 volt level.

Therefore, after the blanking period when transistor 135 once again becomes conducting the level of voltage of capacitors 145 and 146 moves a shorter distance in order to return to the setting of the potentiometer arm than would be required if the arm were set near c on the potentiometer or further away from the 24 volt DC level. In other words, with the arm at the setting a, the amount of time it will take the capacitor combination of 145 and 146 to restore itself after removal of the 24 volt DC level, will be determined substantially by resistor 149 alone. Any additional resistance inserted between the 24 volt DC level and the potentiometer arm as the arm is moved toward c and away from a will reduce the final (discharge) voltage level and thus necessitate a longer period of time for capacitances 145 and 146 to return to the potentiometer arm setting after transistor 135 becomes conducting and the 24 volt DC level is removed.

The parameters are selected in this particular embodiment, so that the maximum time required for the capacitors 145 and 146 to restore themselves to the level of the potentiometer arm when the potentiometer arm is closest to c is 60 milliseconds and the minimum time required when the potentiometer arm is near a is 6 milliseconds.

In connection with the detection ranges discussed above, the 10 ms. blanking period prevents the receiver from responding to a direct or primary echo pulse from a vehicle closer than about four feet from the sonic head, allowing for a pulse length of about 3 ms. within the 10 ms. blanking period for the primary echo pulse, having a round trip transit time of about 8 ms. at approximately 2 ms. per foot of range. However, unusually large vehicles with top reflecting surface about two feet from the sonic head will be detected normally by multiple echoes or reverberation, which provide a secondary echo pulse (from about 8 ms. to 11 ms.) from a second reflection from the vehicle at a reduced but substantial amplitude after the original pulse has been reflected first from the vehicle as a primary echo and then reflected from the sonic head back toward the vehicle to be reflected a second time as a secondary echo from the vehicle.

When transistor 129 is unclamped by transistor 140, i.e., during the range gate open period, a signal applied to the base of transistor 129 will be transmitted to the base of transistor 151. The common collector resistance 152 and the base biasing resistance 153 complete amplifier 35, and the collector of transistor 129 is coupled to the base of transistor 151 through resistor 154 and capacitance 155. Diode 171 couples the base of transistor 151 to ground to discharge capacitor 155 on negative excursions of the signal at the base.

Transistor 129 is forward biased by resistance 153 to be normally conducting, thus holding its collector, as well as that of transistor 140, in a clamped condition, in absence of a signal input to the base of transistor 129. When a signal appears at the base of transistor 129, such signal comprising an amplified pulse of the reflected waves of 19 kc. for example (such as an amplification of the "reflection signal" pulse L in FIG. 5), the negative excursions of the signal received at its base will provide positive excursions at the collector of transistor 129, provided transistor 140 is in unclamping condition, as in the range gate open period. Thus in absence of a reflection signal at the base of transistor 129, the condition of transistor 129 keeps transistor 140 clamped against any pulses which would otherwise originate at its collector from the periodic switching of transistor 140 from and to conduction for the range gate open period as discussed above.

The input signal to transistor 129 is the output signal or the signal at the collector of transistor 121, which is coupled via capacitor 128 to the base of transistor 129. This signal is an AC signal which is applied to the base of transistor 129, and while transistor 140 is clamping the collector of transistor 129 there is no output, but when transistor 129 is unclamped by transistor 140 it is allowed to have a collector voltage as a result of the input AC wave when this signal is applied to its base. The positive half cycles of AC wave applied to the base of transistor 129 are substantially grounded through the base-emitter circuit and the negative half cycle waves tend to cut transistor 129 off, so that it has a high positive voltage appearing at its collector for each of the negative excursions of the 19 kc. reflected signal received during the period that transistor 140 is cut off. In other words, a train at 19 kc. during the range gate open period, which will be essentially 24 volts in amplitude and about 3 milliseconds wide, is applied to the base of transistor 151. In a sense there is a limiter action giving a substantially uniform amplitude wave for a reflected signal output from transistor 129 since a small part of the negative excursion of the AC signal at the base drives its collectors to full positive level. Transistor 151 is normally cut off and upon receipt of the positive going signal from the collector of 129, transistor 151 conducts and applies a series of pulses to transistor 172.

Diode 171 is used to limit the negative excursion of voltage applied at the base of transistor 151 by discharging capacitor 155.

Capacitance 155 is essentially a speed-up capacitor of the type normally used in transistor circuits for applying small high frequency signals to a base of the transistor in order to overcome the time constant involved in bringing the transistor 151 into operation. Capacitance 155 and diode 171 could be omitted to provide a slightly less sensitive response to short pulses of fewer cycles of the 19 kc. signal if desired. Resistance 154 is a current limiting resistance so as not to have an excessive amount of current in the transistor 151. The collector load resistor is indicated by the numeral 156. Capacitors 157 and 158 couple the signal to the next stage, which is an emitter follower and is zero biased, and drives the base of transistor 160. Capacitor 173, between the collector and emitter of transistor 172, maintains transistor 160 forward biased for conduction during the negative excursions of the 19 kc. waves at the base of transistor 172, after the initial positive excursion discharges capacitor 173 through transistor 172.

Upon receipt of a vehicle reflection signal, which is a short burst of 19 kc. waves, the capacitance 157–158 begins to discharge, on each positive excursion of this AC signal at the base of transistor 151, from the substantially full DC voltage to which it had been charged through resistors 156 and 159, and the combined series base-emitter circuits of transistors 172 and 160 in parallel with resistance 159. On each negative excursion of the 19 kc. in the reflection signal applied to the base of transistor 151, capacitance 157–158 starts to charge again and in charging up, it starts to make more positive the base of transistor 172, so that after several cycles of the 19 kc. signals the transistor 172 becomes forward biased on the negative excursion of the signal at the base of transistor 151, causing the emitter circuit of transistor 172 to forward bias transistor 160, so that transistor 160 will become conducting and the voltage at the collector and resistor 161 will be reduced to substantially ground level. Diode 162 is provided as a discharge path for capacitors 157–158 on negative excursions at the base of transistor 172.

After the transistor 172 has initially become conducting, on a negative excursion of the signal at the base of transistor 151, following the first several cycles of the 19 kc. in the received signal pulse, and consequently the transistor 160 has become conducting, the transistor 160 is maintained conducting during the subsequent positive excursions of the 19 kc. signal at the base of transistor 151, for the remainder of the reflection signal pulse, despite the return of transistor 172 to non-conducting during such excursions, since the capacitor 173 across the collector-emitter circuit of transistor 172 holds the base of transistor 160 at forward bias during such excursions. Thus, although transistor 172 becomes alternately conducting and non-conducting with these positive and negative excursions of the 19 kc. reflection signal, the transistor 160 remains conducting for both excursions.

When the 19 kc. signal ceases at the end of the reflection signal pulse, the positive excursions cease at the base of transistors 151 and the collector rises and remains at a high level of DC voltage, so that capacitors 157–158 now continuously charge at a sufficiently slow rate to maintain transistor 172 continuously conducting for more than one transmission pulse repetition period or cycle but preferably less than two such repetition periods, although this hold-over time can be adjusted by varying the size of the capacitance 157–158 to hold over for more than two repetition periods if desired.

This feature of the circuitry enables the vehicle detector to disregard isolated random noise pulses and to respond only to a sustained series of the 19 kc. waves in the reflection signal, and also enables the output indication of detection of a vehicle to be maintained over any momentary loss of reflection signal from less reflective parts of the vehicle, as well as to sustain such output between successive echo pulses in successive pulse repetition cycles or periods, where the reflection signal appears in two or more successive pulse repetition cycles as in the case of longer vehicles or slowly moving or stopped vehicles in the sonic beam, for example.

The conduction of transistor 165 provides a detector output on line 184 by shunting the lower part 175 of a voltage divider circuit 174, 175 to ground through the collector-emitter circuit of transistor 165. The "detector output" can be provided as a pulse by employing a capacitor (not shown) in series with the detector output line 184 if desired, or the detector output can be provided as a direct current or voltage level change as shown, without such series capacitor.

The voltage supplied to the collector of transistor 165 from the voltage divider circuit may be about 15 volts for example, when transistor 165 is non-conducting, and the DC+ supply for this voltage divider is shown independently as preferably obtained from an external source associated with any working ciruit which the detector output is to control, such as the vehicle detector input circuit of a traffic actuated signal controller, for example. With this external source feature, if the DC supply of the detector circuit boards fails, the transistor 165 will become forward biased and shunt the resistor 175 to ground to provide a "detector output" nevertheless, for "fail-safe" operation.

An "indicator output" may also be provided on line 185 if desired, as shown, for operation of an indicator lamp (not shown) for example, in response to presence of a vehicle within the range provided by the range gate open timing adjustment as discussed above, so that this indicator output can be provided concurrently with the "detector output."

This indicator output is provided by a further transistor 177 with base current limiting resistor 178 and voltage divider circuit comprising resistors 179, 180 connected to its collector to provide the "indicator output" by the collector voltage rising by transistor 177 becoming non-conducting whenever transistor 160 becomes conducting, as described above in the presence of a vehicle within the permissible pulse-echo range.

Thus, it will be noted that the forward biasing of transistor 160 as a result of presence of a vehicle as discussed above causes transistor 164 to become non-conducting and transistor 165 to become conducting to provide a detector output, and if desired, as in the preferred form of this action, transistor 160 also causes transistor 177 to be non-conducting to provide an "indicator output."

Capacitor 181 is provided between the 24 volt supply line and ground for filtering purposes.

In the form of the gate and output board circuitry, as above discussed and illustrated, the detector output is suitable for control of electronic or solid state input detector circuits in traffic controllers or for control of computer type inputs in counting circuits and the like. However, if desired, for direct operation of an electromagnetic traffic counter or for completely isolated operation of external controlled circuits in a traffic actuated controller or other device, an electromagnetic relay (not shown) may be employed in the detector output circuit. In such relay form of the circuit, the electromagnetic relay coil could be substituted for resistor 174 in the voltage divider circuit 174, 175 to energize this relay coil when transistor 165 becomes conducting, for example. Alternatively the relay coil could be substituted for resistor 175 in the voltage divider circuit and therefore be normally energized with transistor 165 normally non-conducting but be released when the relay coil is shunted by transistor 165 becoming conducting.

A further alternative would be to have the electromagnetic relay coil in series between the collector of transistor 165 and the 24 volt DC+ supply, with the voltage divider circuit 174–175 omitted. In the latter case, the relay would be energized only when transistor 165 becomes conducting.

As a further variation, with the relay coil in series between the collector of transistor 165 and the 24 volt supply line, and the voltage divider 175, 174 being eliminated, the base of transistor 165 could then be connected directly through series resistor 163 to the collector of transistor 160, thus eliminating transistor 164 and resistor 176. Transistor 177 and resistors 179, 180 could then also be eliminated, and one of the relay contacts (not shown) used for operating an indicator lamp.

In this additional alternative also, the relay would be energized only when transistor 165 is conducting, but transistor 165 would be normally conducting in absence of a vehicle, and thus the conduction conditions would be the reverse of the immediately preceding alternative, in which transistor 164 was intervening.

In any of the above alternatives of providing a relay type of output, the electromagnetic relay would be provided with output contacts controlled by its coil, for closing or opening one or more output circuits as desired.

It will be noted that FIG. 5 illustrates two pulse-echo or repetition period cycles in one preferred set of time values for example, showing the time relation of the basic A–B wave form outputs of the repetition rate multivibrator 20 as described above and the various other related wave forms from other parts of the block diagram of FIG. 3 and the related circuit diagram of FIG. 4. These wave forms in FIG. 5 are designated by capital letters which correspond with capital letters on the block diagram of FIG. 3 for example. Several of these wave forms have already been referred to in the above description.

It will also be noted that maximum and minimum range setting adjustments are illustrated for certain of the wave forms O, R, U for example, and that illustrative values of voltages in one preferred embodiment of the circuit are shown as examples of voltage levels which may be involved in the circuit at the points where these wave forms apply.

It will be appreciated that the voltages illustrated are illustrative and not limiting, as also are the time cycles illustrated.

Although alternate arrangements or forms of a sonic vehicle detector in accordance with the invention have been described or mentioned above, it will be obvious to those skilled in the art that other arrangements or modifications of the circuitry, or substitution of parts, may be made without departing from the spirit of the invention within the scope of the accompanying claims, which follow:

I claim:

1. A vehicle detection system including in combination,
  a continuously running oscillator generating an electrical signal of ultrasonic frequency,
  a free-running multivibrator operating successively in first and second conduction states in a repeated time cycle, a pulse length timer actuated by said multivibrator in its first state to time a short pulse period which is a small part of said cycle, gated amplifier means for amplifying said electrical signal, a clamping circuit normally clamping a part of said amplifier means thus making said amplifier ineffective to pass said electrical signal except when unclamped, said clamping circuit being coupled to said pulse length timer to release said amplifier from said normal clamped condition to amplify said electrical signal during said short pulse period, transmitting-receiving means including an electrical-acoustical transducer receiving the amplified electrical signal from said amplifier for transmitting sonic waves therefrom for a desired detection zone for vehicles in said short pulse periods, said transmitting-receiving means also receiving sonic waves reflected from a vehicle or other object in said zone and providing a high frequency electrical signal output corresponding to said reflected sonic waves, tuned receiver amplifier means receiving said electrical signal output from said transmitter-receiver for providing an amplified received signal output therefrom, said tuned receiver amplifier means including a gated receiver output amplifier for amplifying said received signal output when gated on therefor, a receiver amplifier gating circuit, a receiver output blanking pulse generator actuated by said free-running multivibrator to provide a timed blanking pulse output throughout said short transmission pulse period and extending beyond the end thereof for a further brief period, a range period pulse generator coupled to said blanking pulse generator to provide a timed gating control pulse output from the end of said blanking pulse for a time period corresponding to a desired receiving period for said received electrical signals corresponding to a desired effective detection range in said zone, said receiver gating circuit being coupled to said range period generator to gate said receiver amplifier off for blocking amplification of received signal input thereto during said blanking pulse output, and said receiver gating circuit controlled by said range period generator to gate said receiver amplifier on to provide amplified received output signals during said timed gating control pulse output, and means for providing a vehicle detection indicating output in response to the amplified received signals of said receiver amplifier when gated on.

2. A vehicle detection system as in claim 1, and said receiver gating circuit including a second clamping circuit controlled by said range period generator for clamping the output of said gated amplifier in said blanking time period, said second clamping circuit unclamping said gated receiver amplifier in response to said timed gating control output to pass the amplified received signals to said output means for said range period.

3. A vehicle detection system as in claim 1 and said range period generator including a ramp voltage generator, and range setting means for setting a voltage therefor over which said ramp voltage changes progressively for timing the gated-on period for said gated receiver amplifier to a terminating voltage level at which said receiver gating circuit is operated to gate off again said gated receiver amplifier.

4. A vehicle detection system as in claim 1 and said output means including means for integrating a succession of said ultrasonic frequency waves in said received electrical signal from said reflected pulse to provide said detection indicating output after a substantial number of said waves have been so integrated.

5. A vehicle detection system as in claim 4, and said output means including an emitter-follower coupled to the output of said gated receiver amplifier to be operated thereby, an output amplifier coupled to said emitter-follower to be controlled by the latter, and detector output amplifier means coupled to said output amplifier to provide said detection indicating output in response to said integrated output.

6. A vehicle detection system as in claim 4 and including means for restoring the output of said integrating means to a reference level over a time period exceeding the period of said repetition cycle, whereby said detection indicating pulse output will be provided in response to a received signal pulse output of said gated amplifier of sustained time length of ultrasonic frequency received reflected signals and will be sustained over successive pulse-echo cycles for a reflecting vehicle remaining in wave reflecting position in said detection zone more than one such cycle.

7. A vehicle detection system as in claim 6 and said output means including means for adjusting said restoring time period.

8. A vehicle detection system as in claim 1 and in which said first mentioned gated amplifier includes a transistor amplifier having a base coupled to said oscillator output and having its collector-emitter circuit coupled between direct current supply and reference voltages, said coupling including substantially equal resistors in the collector circuit and emitter circuit respectively between said supply and reference voltages and the usual load resistors in said circuit, said clamping circuit being coupled between said collector circuit load resistor and said emitter circuit load resistor, whereby said transistor amplifier is clamped and unclamped without substantial change in the direction current voltage level of its collector.

9. A vehicle detection system as in claim 8 and including a capacitor across said clamping circuit to provide a rounded shaped pulse envelope of said ultrasonic frequency electrical signal output.

10. A vehicle detection system as in claim 1, said receiver amplifier gating circuit including two transistors having their emitters coupled in parallel and having their collectors coupled in parallel through a common load resistor, the base of one transistor being coupled into the receiver amplifier to be controlled by the received electrical signal thereof, and the base of the other transistor being coupled to the output of said range period generator, said bases being normally forward biased in absence of input signal and becoming reverse biased respectively by respective inputs, whereby said receiver amplifier will be clamped to prevent any output therefrom except during concurrent inputs at the respective bases from said received electrical signal and from the output of said range period generator.

11. In a vehicle detector of the gated sonic pulse-echo type, the combination of an oscillator for generating high frequency electrical waves, a transistor pulse shaper amplifier coupled to said oscillator to receive said waves to provide a pulse modulated output thereof, said pulse shaper amplifier including reactive circuit means for providing a shaped modulation pulse output of said high frequency waves having a relatively long rise time and fall time in amplitude for a substantial part of the pulse length when gated on for a brief time, transistor amplifiers coupled as a pulse repetition rate free-running multivibrator alternately switching between two conduction conditions at alternate time periods, a pulse timer operated by said multivibrator upon switching to a particular one of its said conditions to provide a brief pulse having a time period which is a small part of said alternate time periods, a transistor clamp circuit operated by said pulse timer to so gate said pulse shaper amplifier for providing said shaped pulse output, an electro-sonic transducer for said high frequency waves, means including an amplifier and an emitter-follower for coupling said shaped pulse output of said pulse shaper amplifier to said transducer, means including a tuned receiver transistor amplifier coupled to said transducer to amplify said high frequency waves received therefrom, a transistor switching circuit having a resistance-capacitance timing circuit coupled to said multivibrator to generate a blanking pulse, a further transistor switching circuit including a further resistance-capacitance timing circuit coupled therein to generate a range period output following said blanking pulse, a transistor gating circuit for said receiver amplifier circuit coupled to said last mentioned two transistor switching circuits for gating said receiver amplifier off during said blanking pulse and on to provide an amplified received signal output in response to a received signal during said range period output.

References Cited

UNITED STATES PATENTS 3,110,008 11/1963 Kendall et al. ______ 340—1 X
3,176,266 3/1965 Auer ____________ 340—1 X RICHARD A. FARLEY, *Primary Examiner.*

UNITED STATES PATENT OFFICE
CERTIFICATE OF CORRECTION

Patent No. 3,362,009　　　　　　　　　　　　January 2, 1968

Bernard J. Midlock

It is certified that error appears in the above identified patent and that said Letters Patent are hereby corrected as shown below:

Column 1, line 69, "cylce" should read -- cycle --. Column 3, line 26, "or leased during" should read -- or released during --. Column 7, line 3, "or obsence" should read -- or absence --; line 44, "transistors 61" should read -- transistor 61 --. Column 9, line 4, "will not be" should read -- will now be --. Column 16, line 36, "direction" should read -- direct --.

Signed and sealed this 10th day of February 1970.

(SEAL)
Attest:

Edward M. Fletcher, Jr.　　　　　　　　　WILLIAM E. SCHUYLER, JR.
Attesting Officer　　　　　　　　　　　　　Commissioner of Patents